United States Patent
Chung et al.

(10) Patent No.: US 9,714,759 B2
(45) Date of Patent: Jul. 25, 2017

(54) APPARATUS OR CIRCUIT FOR DRIVING A DC POWERED LIGHTING EQUIPMENT

(75) Inventors: Henry Shu Hung Chung, Hong Kong (HK); Nan Chen, Hong Kong (HK)

(73) Assignees: City University of Hong Kong, Kowloon (HK); E. Energy Double Tree Limited, Kowloon (HK)

( * ) Notice: Subject to any disclaimer, the term of this patent is extended or adjusted under 35 U.S.C. 154(b) by 233 days.

(21) Appl. No.: 13/505,483

(22) PCT Filed: Feb. 10, 2010

(86) PCT No.: PCT/CN2010/070600
§ 371 (c)(1),
(2), (4) Date: Jul. 20, 2012

(87) PCT Pub. No.: WO2011/050597
PCT Pub. Date: May 5, 2011

(65) Prior Publication Data
US 2012/0274237 A1    Nov. 1, 2012

(30) Foreign Application Priority Data
Nov. 2, 2009    (HK) .................................. 09110182

(51) Int. Cl.
H05B 41/38    (2006.01)
F21V 23/02    (2006.01)
(Continued)

(52) U.S. Cl.
CPC ......... *F21V 23/02* (2013.01); *H05B 33/0809* (2013.01); *H05B 33/0815* (2013.01); *F21Y 2115/10* (2016.08); *Y02B 20/346* (2013.01)

(58) Field of Classification Search
CPC .................................. H05B 41/36; G09G 5/00
(Continued)

(56) References Cited

U.S. PATENT DOCUMENTS 5,309,062 A * 5/1994 Perkins et al. ................... 315/53
5,917,289 A * 6/1999 Nerone et al. ............ 315/209 R
(Continued)

FOREIGN PATENT DOCUMENTS

CN    2497510 Y    6/2002
CN    2539379 Y    3/2003
(Continued)

*Primary Examiner* — Douglas W Owens
*Assistant Examiner* — Wei Chan
(74) *Attorney, Agent, or Firm* — Renner, Kenner, Greive, Bobak, Taylor & Weber Co., LPA

(57) ABSTRACT

An apparatus that can operate with electronic ballasts (10) for electric discharge lamps to drive dc-powered lighting equipment (26) is provided. The apparatus is directly connected to the output of the electronic ballast (10) and is then used to control the power being supplied to the dc-powered lighting equipment (26). The maximum power delivered to the dc-powered lighting equipment (26) is substantially equal to the rated output power of the electronic ballast (10). A switching converter is acted as the necessary input impedance for the electronic ballast (10). Thus, the active power and reactive power drawn from the electronic ballast (10) can be controlled. The output of the switching converter provides dc power for the dc-powered lighting equipment (26).

15 Claims, 11 Drawing Sheets

(51) Int. Cl.
*H05B 33/08* (2006.01)
*F21Y 115/10* (2016.01)

(58) Field of Classification Search
USPC .......... 345/211, 46; 315/224, 297, 119, 226, 315/244, 291, 225, 121, 308; 363/16
See application file for complete search history.

(56) References Cited

U.S. PATENT DOCUMENTS

| | | | | |
|---|---|---|---|---|
| 6,411,045 | B1* | 6/2002 | Nerone | H02M 7/538 |
| | | | | 315/185 R |
| 6,426,597 | B2* | 7/2002 | Rast | H05B 41/2825 |
| | | | | 315/219 |
| 6,646,392 | B2* | 11/2003 | Slegers | 315/291 |
| 6,696,784 | B2* | 2/2004 | Yoshida et al. | 313/498 |
| 7,309,963 | B2* | 12/2007 | Busse et al. | 315/307 |
| 7,394,207 | B2* | 7/2008 | Franck et al. | 315/209 R |
| 7,397,196 | B2* | 7/2008 | Leyten et al. | 315/224 |
| 7,541,744 | B2* | 6/2009 | Braun et al. | 315/209 R |
| 7,944,149 | B2* | 5/2011 | Imam et al. | 315/209 R |
| 8,053,999 | B2* | 11/2011 | Smethurst | 315/225 |
| 8,089,213 | B2* | 1/2012 | Park | 315/227 R |
| 8,143,795 | B2* | 3/2012 | Breuer et al. | 315/224 |
| 8,174,202 | B2* | 5/2012 | Nijhof et al. | 315/226 |
| 8,330,382 | B2* | 12/2012 | Komatsu | 315/224 |
| 8,531,122 | B2* | 9/2013 | Braun et al. | 315/224 |
| 2001/0007360 | A1* | 7/2001 | Yoshida et al. | 257/89 |
| 2001/0020830 | A1* | 9/2001 | Rast | H05B 41/2825 |
| | | | | 315/172 |
| 2005/0110431 | A1* | 5/2005 | Ben-Yaakov | H02M 3/3372 |
| | | | | 315/291 |
| 2006/0152169 | A1* | 7/2006 | Lurkens | 315/244 |
| 2006/0192437 | A1* | 8/2006 | Tolle et al. | 307/113 |
| 2007/0279405 | A1* | 12/2007 | Agarwal et al. | 345/211 |
| 2008/0036390 | A1* | 2/2008 | Cho et al. | 315/169.4 |
| 2009/0146581 | A1 | 6/2009 | Melai et al. | |
| 2009/0251934 | A1* | 10/2009 | Shteynberg et al. | 363/81 |
| 2009/0267528 | A1* | 10/2009 | Nijhof et al. | 315/226 |
| 2009/0284179 | A1* | 11/2009 | Ray et al. | 315/306 |
| 2010/0045196 | A1* | 2/2010 | Breuer et al. | 315/224 |
| 2010/0096976 | A1* | 4/2010 | Park | 313/498 |
| 2010/0097827 | A1* | 4/2010 | Ben-Yaakov | 363/65 |
| 2010/0127625 | A1* | 5/2010 | Minarczyk et al. | 315/119 |
| 2010/0194296 | A1* | 8/2010 | Park | H05B 33/0803 |
| | | | | 315/185 R |
| 2012/0176056 | A1* | 7/2012 | Rudolph | 315/200 R |
| 2012/0274237 | A1* | 11/2012 | Chung et al. | 315/297 |
| 2014/0015542 | A1* | 1/2014 | Bai et al. | 324/548 |

FOREIGN PATENT DOCUMENTS

| | | |
|---|---|---|
| CN | 1144510 C | 3/2004 |
| CN | 201114951 Y | 9/2008 |

* cited by examiner

PRIOR ART $P_{LED}$ versus $|v_L|$.

$P_{LED}$ versus φ.

$P_{LED}$ versus $Q_{LED}$.

APPARATUS OR CIRCUIT FOR DRIVING A DC POWERED LIGHTING EQUIPMENT

FIELD OF THE INVENTION

The invention relates to an apparatus or circuit that can operate with electronic ballasts for electric discharge lamps to drive dc-powered lighting equipment and more particularly to an apparatus or circuit for modifying existing circuits for powering lighting equipment to accept light emitting diode 'LED' lamps without requiring the replacement of any electronic ballast circuitry for the existing lighting equipment circuitry.

BACKGROUND OF THE INVENTION

Gas discharge lamps have been widely used in various residential, commercial and industrial sectors because of their high efficacy (lumen per watt). However, as they cannot be directly connected to the ac mains, they are driven by a device called a ballast. The ballast generates a high voltage and applies it across the two ends of the lamp to ignite it. The ballast also regulates the current flowing through the lamp.

Ballasts can be categorized into two main types, namely electromagnetic and electronic ballasts. Electromagnetic ballasts have the advantages of extremely high reliability and long lifetime, and robustness against transient voltage surge (e.g. due to lightning) and hostile working environment (e.g. high humidity and wide variation of temperature). Particularly, they offer superior lamp-arc stability performance in high-intensity discharge (HID) lamps. Also, the inductor core materials and winding materials are recyclable.

Electronic ballasts for fluorescent lamps (low-pressure discharge lamps) have been widely used and it has been shown that their use has an overall economic benefit. They also have good performance characteristics, such as high input power factor, low input current total harmonic distortion, low electromagnetic interference (EMI), good lamp current crest factor, and low flickering. Moreover, operating at high frequency (typically above 20-kHz) electronic ballasts can eliminate the flickering effects of fluorescent lamps and achieve a higher efficacy than mains-frequency (50 Hz or 60 Hz) operated electromagnetic ballasts. Therefore fluorescent lamps driven by electronic ballasts consume less energy for the same light output when compared with lamps driven by electromagnetic ballasts.

Fluorescent lamps contains mercury vapor inside the glass tube. This is a serious concern for landfills and waste incinerators where the mercury may be released and contribute to air and water pollution.

With recent advancements in microelectronics technology, solid-state lighting, such as LED, has become popular in general lighting and special purpose lighting. Compared with fluorescent lamps, LEDs have a long life expectancy, are resistant to vibration failure, consume low amounts of power, operate on a low voltage, are highly reliable, and contain no mercury. It would be advantageous to have LED lamps that can directly replace the gas discharge lamps in existing light circuitry or fixtures. However, where this has been tried before, although the existing fluorescent lamp fixtures may remain unchanged, the ballasts installed inside the lamp fixtures have to be removed or changed. Moreover, it requires rewiring of the lighting circuit.

The key challenge in designing an LED lamp for use with an electronic ballast is the way of handling the difference between the rated power delivered by the electronic ballast and the required power of the LED lamp. In general, the required power of the LED lamp is only about one-half of the rated power of the electronic ballast.

OBJECTS OF THE INVENTION

An object of the invention is to mitigate or obviate to some degree one or more problems associated with existing lighting equipment circuitry.

The above object is met by the combination of features of the main claim; the sub-claims disclose further advantageous embodiments of the invention.

One skilled in the art will derive from the following description other objects of the invention. Therefore, the foregoing statement of object is not exhaustive and serves merely to illustrate some of the many objects of the present invention.

SUMMARY OF THE INVENTION

This invention discloses a method of dealing with the difference in the rated power of the ballast and the LED lamp and a circuit for modifying existing light equipment/light element/lamp element circuitry. The proposed modified light element circuitry can handle and control the amount of power supplied to the LED lamp.

In general, there is provided an apparatus or a circuit for modifying existing circuits for driving lighting equipment to accept light emitting diode 'LED' lamps without requiring the replacement of any electronic ballast circuitry of the existing lighting equipment circuitry.

In a first main aspect of the invention, there is provided a circuit for controlling power being supplied to a dc-powered light element in a lighting circuit, said power control circuit being connectable directly to an output of an electronic ballast of the lighting circuit, said power control circuit being arranged to control a level of power being supplied to said dc-powered light element such that a maximum power deliverable to the dc-powered light element is substantially equal to a rated output power of the electronic ballast. Preferably, the circuit is configured for connection to output terminals of an electronic ballast in an existing light circuit. Preferably, the light element comprises a solid-state light element such as a light emitting diode 'LED'.

Preferably, the power control circuit is mounted in a LED lamp tube wherein the LED lamp tube is configured to be locatable in an existing lamp fixture without requiring modification of the existing light circuit or the existing lamp fixture.

Preferably, the power control circuit comprises first and second inductor components connectable to respective light element power supply terminals of the light circuit, and a light emitting diode drive circuit connected between said first and second inductors. Preferably also, each of the first and second inductors has an inductance value which is proportional to a resistance of a lamp filament divided by a steady-state operating frequency of the existing light circuit.

In a second main aspect of the invention, there is provided a lamp fixture comprising: a light circuit including an electronic ballast for powering a dc-powered light element connected between output terminals of the light circuit; first and second inductors connected to respective ones of the output terminals; a driver circuit for a dc-powered light element connected between said first and second inductors; and a dc-powered light element connected to the driver circuit to be powered by said driver circuit. The dc-powered lamp element may be one or more light emitting diodes 'LEDs'. The light circuit may comprise a switching converter arranged to model input impedance characteristics for the electronic ballast.

In a third main aspect of the invention, there is provided a light circuit for powering a dc-powered light element, said light circuit comprising: an electronic ballast for powering a dc-powered light element connected between output terminals of the light circuit; first and second inductors connected to respective ones of the output terminals; a driver circuit for a dc-powered light element connected between said first and second inductors; and a dc-powered light element connected to the driver circuit to be powered by said driver circuit. The light circuit may have LED connected thereto.

In a fourth main aspect of the invention, there is provided a LED lamp tube comprising light circuit having: an electronic ballast for powering a dc-powered light element connected between output terminals of the light circuit; first and second inductors connected to respective ones of the output terminals; a driver circuit for a dc-powered light element connected between said first and second inductors; and a dc-powered light element connected to the driver circuit to be powered by said driver circuit; wherein said lamp tube is configured to be locatable in an existing lamp fixture without requiring modification of an existing light circuit or the existing lamp fixture.

In a fifth main aspect of the invention, there is provided a method of controlling power being supplied to a dc-powered light element in a lighting circuit, said power control circuit being connectable directly to an output of an electronic ballast of the lighting circuit, said method comprising: controlling a level of power being supplied to said dc-powered light element such that a maximum power deliverable to the dc-powered light element is substantially equal to a rated output power of the electronic ballast. The power being supplied to the dc-powered light element may be controlled to be substantially less than the maximum power deliverable to said light element but such that said light element emits a similar light output as a fluorescent light element operating at said maximum power.

An application of the proposed technology is preferably an LED lamp tube. By placing the apparatus inside the lamp tube, the lamp can operate with electronic ballasts directly without replacement of the existing electronic ballasts with LED ballasts and without modification of the infrastructure or fixtures of the lighting network. The solution is environmentally-friendly. Of particular importance, it can save energy because the required power consumption of the LED lamp that gives the same brightness as a fluorescent lamp is less than that of the fluorescent lamp. Since the proposed technology can control the power supply to the lamp, it can offer an extra function of dimming the lamp, even with an existing non-dimmable electronic ballast.

The summary of the invention does not necessarily disclose all the features essential for defining the invention; the invention may reside in a sub-combination of the disclosed features.

BRIEF DESCRIPTION OF THE DRAWINGS

The foregoing and further features of the present invention will be apparent from the following description of preferred embodiments which are provided by way of example only in connection with the accompanying figures, of which.

DESCRIPTION OF PREFERRED EMBODIMENTS

The following description is of a preferred embodiment by way of example only and without limitation to the combination of features necessary for carrying the invention into effect.

The invention relates to an apparatus or circuit that can operate with electronic ballasts for electric discharge lamps to drive dc-powered lighting equipment and more particularly to an apparatus or circuit for modifying existing circuits for driving dc powered lighting equipment to accept light emitting diode 'LED' lamps without requiring the replacement of any electronic ballast circuitry for the existing dc powered lighting equipment circuitry. References herein to "lighting equipment", "light element", "lamp" and "lamp element" will be taken to refer to the same technical feature, namely a light element as exemplified by a de-powered, solid-state light element such as an LED.

Figure 1:
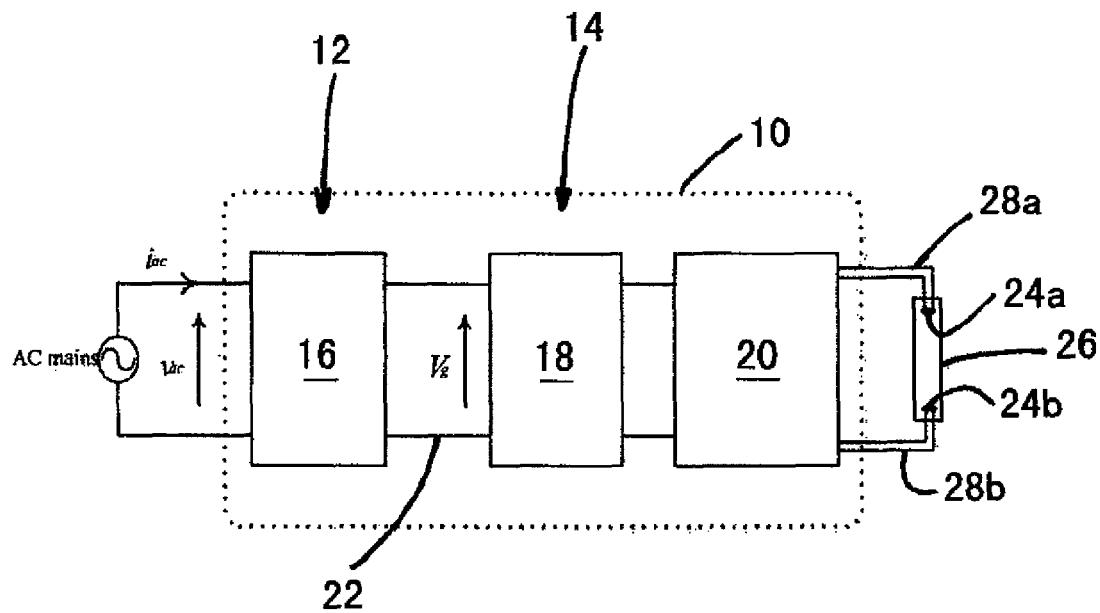
FIG. 1 is a block schematic diagram of a conventional electronic ballast circuit.

By way of understanding the context of the invention, a basic block schematic diagram of a conventional modern electronic ballast 10 denoted by dashed outline in FIG. 1. It consists of two power processing stages 12, 14. The first stage 12 is an active or a passive power factor correction circuit 16 and the second stage is a high-frequency inverter 18 having an output resonant tank circuit 20. The two stages 12, 14 are interconnected by a high-voltage dc link 22. The inverter 18 generates a square voltage waveform at an input of the resonant tank 20. The resonant tank 20 is used to preheat filaments 24a,b of a light element 26 connected to respective output terminals 28a,b of the electronic ballast 10. The resonant tank 20 is also used to maintain the filament temperature, generate a sufficiently high voltage to ignite the lamp 26, facilitate soft-switching of the inverter 18, and give a near sinusoidal lamp current.

Figure 2:
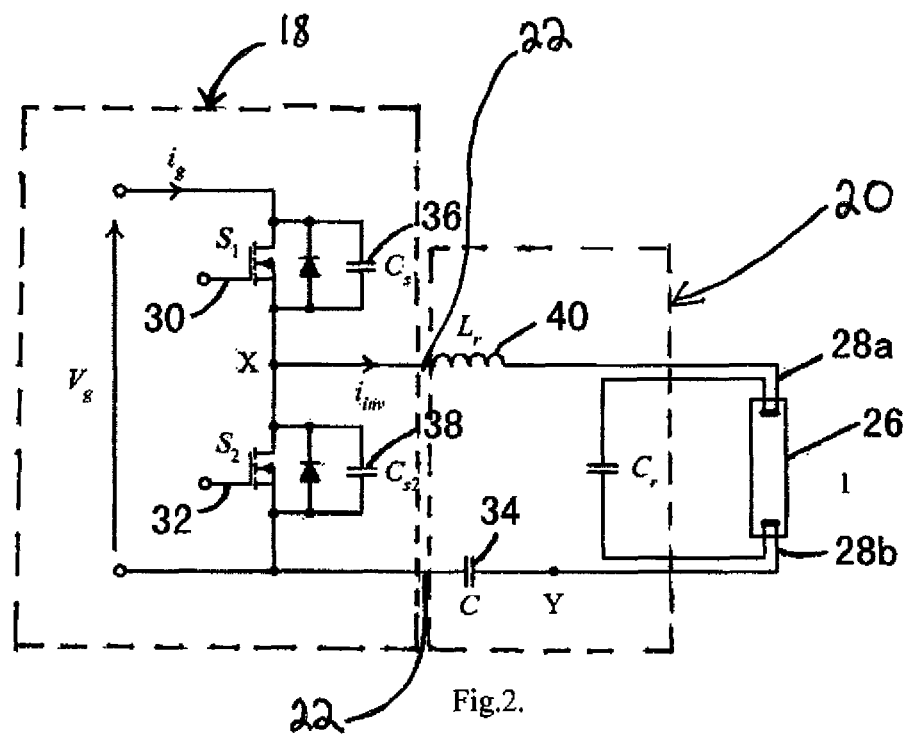
FIG. 2 is a schematic circuit diagram of a voltage-fed half-bridge series-resonant parallel-loaded inverter commonly used for the second stage of the ballast circuit of FIG. 1.
Figure 3:
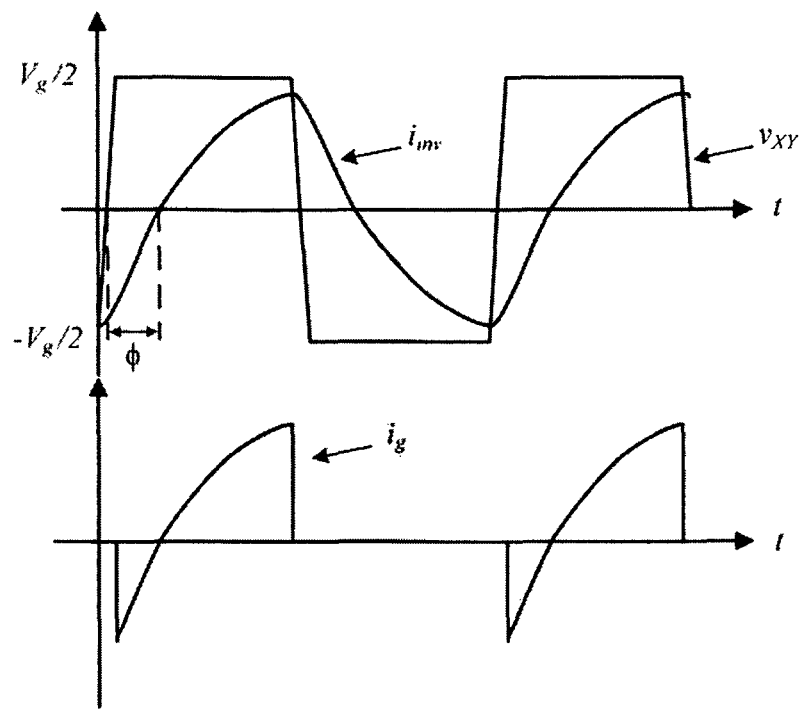
FIG. 3 shows waveforms associated with the inverter stage of the ballast circuit of FIG. 1.

FIG. 2 shows a circuit schematic diagram of a voltage-fed half-bridge series-resonant parallel-loaded inverter 18 popularly used for the second stage 14. The inverter 18 comprises first and second integrated circuit switches 30, 32. FIG. 3 shows the key waveforms in the inverter 18. The duty cycles of the switches $S_1$ 30 and $S_2$ 32 are both slightly less than 0.5. A capacitor C 34 is used to provide a stable dc voltage of $V_g/2$ at node 'Y'. $C_{s1}$ 36 and $C_{s2}$ 38 create zero-voltage-switching (ZVS) conditions for $S_1$ 30 and $S_2$ 32 and the switching frequency of $S_1$ and $S_2$ is slightly higher than the natural frequency of the resonant tank 20 so as to ensure ZVS of $S_1$ and $S_2$. A near-square ac voltage $v_{XY}$ of amplitude $V_g/2$ appears across nodes 'X' and 'Y'. Since the resonant tank 20 is designed to operate at a high quality factor, the fundamental component of the square wave is the dominant frequency component in the circuit. The inverter output current $i_{inv}$ lags $v_{XY}$ by an angle $\phi$.

At the preheating stage, the lamp 26 is non-conducting and its equivalent resistance is very high. Thus, the quality factor is very high. The switching frequency of $S_1$ and $S_2$ is much higher than the natural frequency for a fixed duration to preheat the filaments 24a,b. At the ignition stage, it is decreased towards resonance to generate a high voltage across the lamp 26. At the steady state, it is further decreased to the frequency at which the lamp power is at the rated value. Two auxiliary windings are added on the resonant inductor $L_r$ 40 for separately heating the filaments to the appropriate temperature.

Figure 4:
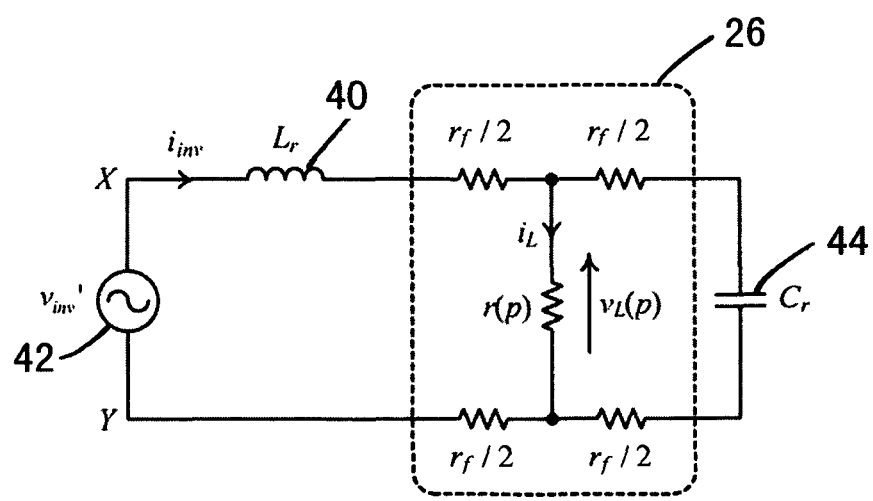
FIG. 4 is an equivalent circuit model for the inverter stage of the ballast circuit of FIG. 1 without inverter current feedback.

FIG. 4 shows the equivalent circuit model in which the inverter 18 is modeled by a low-frequency sinusoidal voltage source $v_{inv}'$ 42. For the sake of simplicity, the filament resistance $r_f$ is ignored in the following analysis. This is valid because $r_f$ is much smaller than the reactances of $L_r$ 40 and $C_r$ 44. Thus, $i_{inv}$ can be expressed by $$i_{inv} = \frac{v_{inv}'}{Z_{inv}(p)} \quad (1)$$

where $$Z_{inv}(p) = j\omega L_r + \frac{r_L(p)}{1 + j\omega C_r r_L(p)},$$

$\omega = 2\pi f$, and f is the switching frequency.

Thus, based on (1), the magnitude of $i_{inv}$, rated $|i_{inv}|$, is equal to $$|i_{inv}| = |v_{inv}'|\sqrt{\frac{1 + \omega^2 C_r^2 r_L(P_r)}{\omega^2 L_r^2 + [r_L(P_r) - \omega^2 L_r C_r r_L(P_r)]^2}} \quad (2)$$

where $$|v_{inv}'| = \frac{\sqrt{2} V_g}{\pi}$$

and $P_r$ is the rated power of the lamp.

Figure 6:
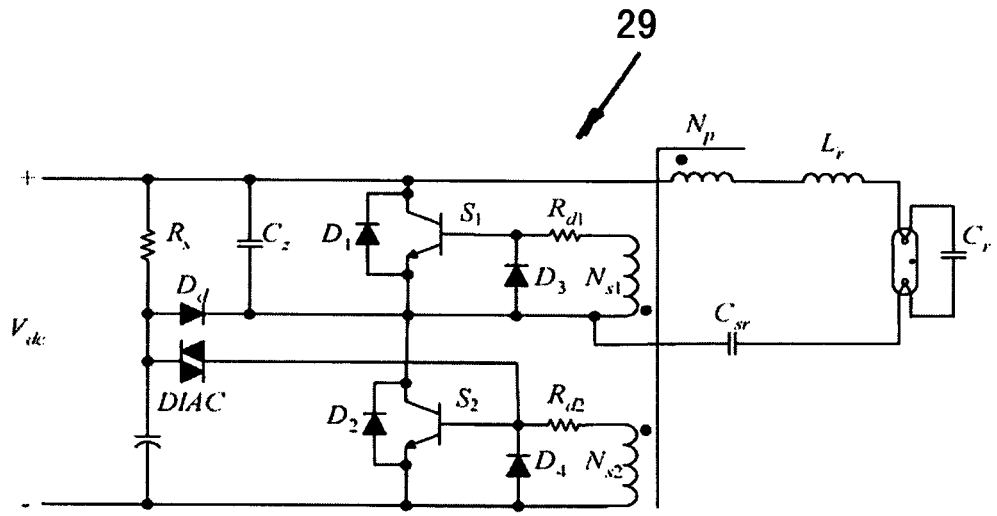
FIG. 6 is a schematic circuit diagram of the ballast circuit of FIG. 1 with a self-oscillating gate drive.

Electronic ballasts are typically driven by integrated circuits. Driving of the switches in FIG. 2 is accomplished by two possible methods. The first method is to use a self-oscillating circuit 29 (FIG. 6). $S_1$ and $S_2$ are bipolar transistors (BJTs) or MOSFETs, but BJTs are the most dominant and feasible choice. The base driving currents or gate voltages are derived from the resonant inductor 40 through a saturable or non-saturable transformer. The second method is to use a ballast integrated circuit (IC). $S_1$ and $S_2$ are usually MOSFETs. Nevertheless, the first of the above solutions is the dominant solution, because its circuit is simple, robust, and cost effective.

Some ballasts have a feedback function for regulating the lamp current. In practice, the lamp current $i_L$ is regulated indirectly by regulating the inverter output current $i_{inv}$, in order to control the power being supplied to the fluorescent lamp 26. This is valid because the reactance of $C_r$ 44 is larger than the lamp resistance. Thus, $i_{inv} \approx i_L$. There are three possible methods of regulating the value of $i_{inv}$ 1) Control of the magnitude of the voltage $V_g$—This method requires using a power factor correction circuit having variable dc output voltage.
2) Control of the switching frequency of $S_1$ and $S_2$—The reactances of $L_r$ and $C_r$ vary with the switching frequency. Thus, the magnitude of the lamp current, and thus the lamp power, can be regulated.
3) Control of the effective value of $L_r$ and $C_r$—The output impedance can be varied by changing the effective values of $L_r$ and $C_r$. $L_r$ is implemented by using a sloped gap magnetic core. The resonant capacitor is realized by using a fixed capacitor in series with a switched-capacitor module. The duty time of the switched capacitor module determines the effective capacitance of the resonant capacitor, so that the lamp current can be adjusted.

Figure 5:
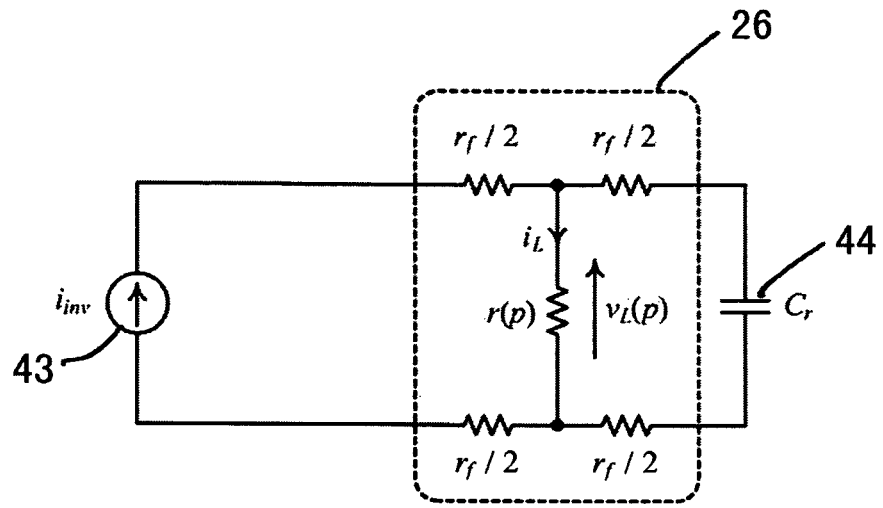
FIG. 5 is an equivalent circuit model for the inverter stage of the ballast circuit of FIG. 1 with inverter current feedback.

FIG. 4 shows the equivalent circuit of the ballast-lamp system without inverter current feedback. FIG. 5 shows the equivalent circuit of the ballast-lamp system with inverter current feedback, in which the ballast is modeled as a current source $i_{inv}$ 43 supplying to the lamp 26.

Figure 7:
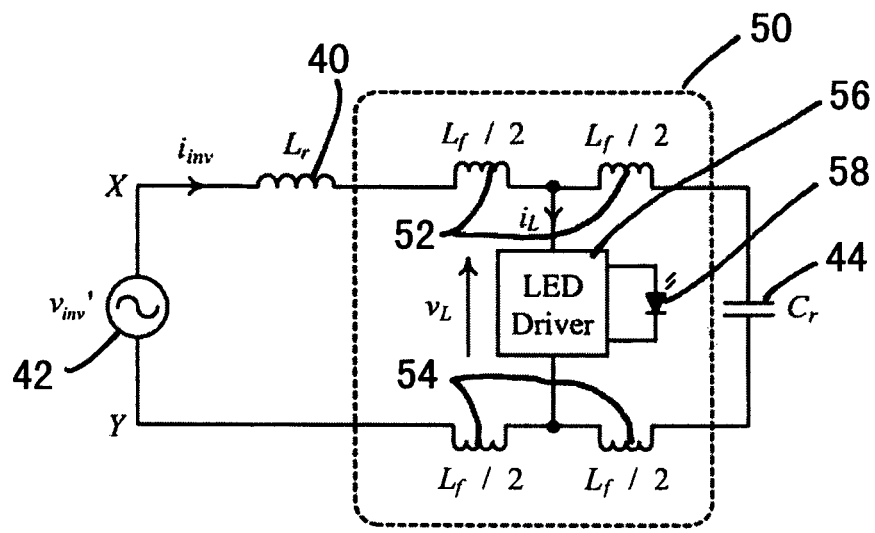
FIG. 7 is an equivalent circuit model for the inverter stage of the ballast circuit of FIG. 1 modified according to the invention and without inverter current feedback.
Figure 8:
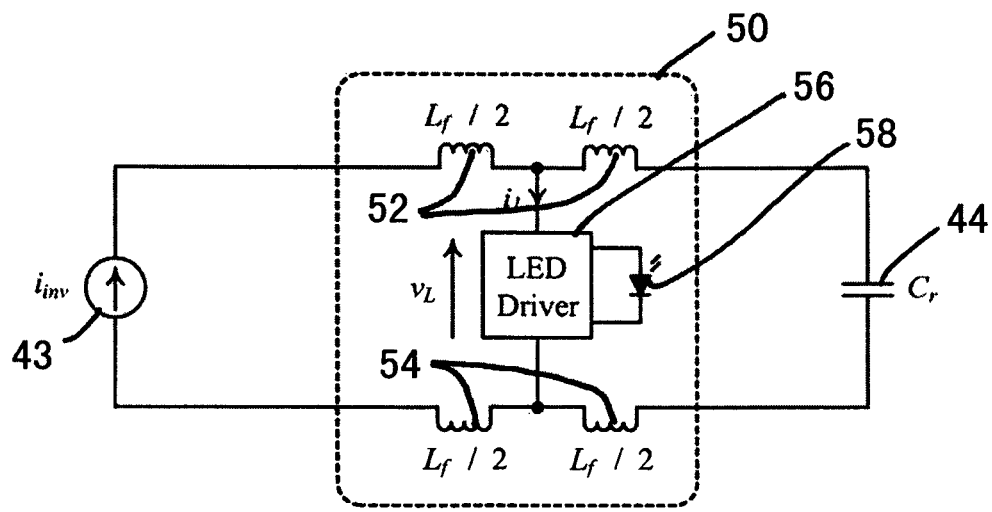
FIG. 8 is an equivalent circuit model for the inverter stage of the ballast circuit of FIG. 1 modified according to the invention and with inverter current feedback.

FIGS. 7 and 8 shows how an LED lamp 50 can directly replace the fluorescent lamp in an existing light circuit having an electronic ballast. FIG. 7 does not have inverter current feedback whereas FIG. 8 does have inverter current feedback. In each case, the two filaments 24a,b are replaced or modelled by two inductors 52, 54 of value $L_f$. The value of $L_f$ is designed to be the same as the filament resistance in FIG. 1 at the operating frequency. That is $$L_f = \frac{r_f}{2\pi f} \quad (3)$$

Figure 9:
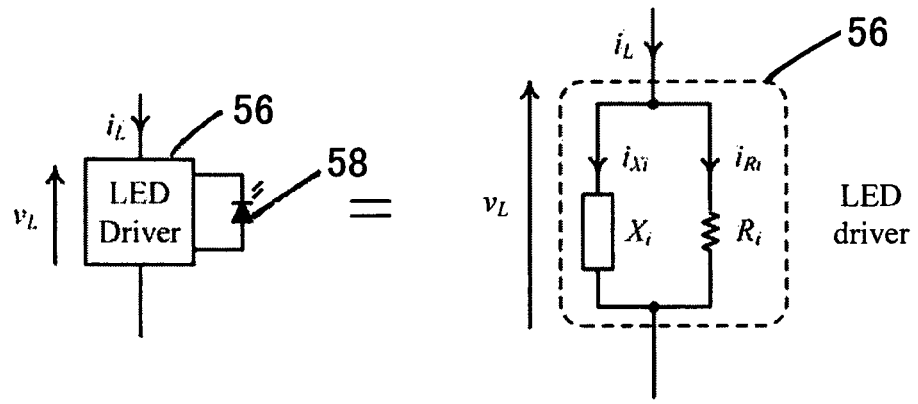
FIG. 9 is an equivalent input of a solid-state light element driver circuit according to the invention.
Figure 10A:
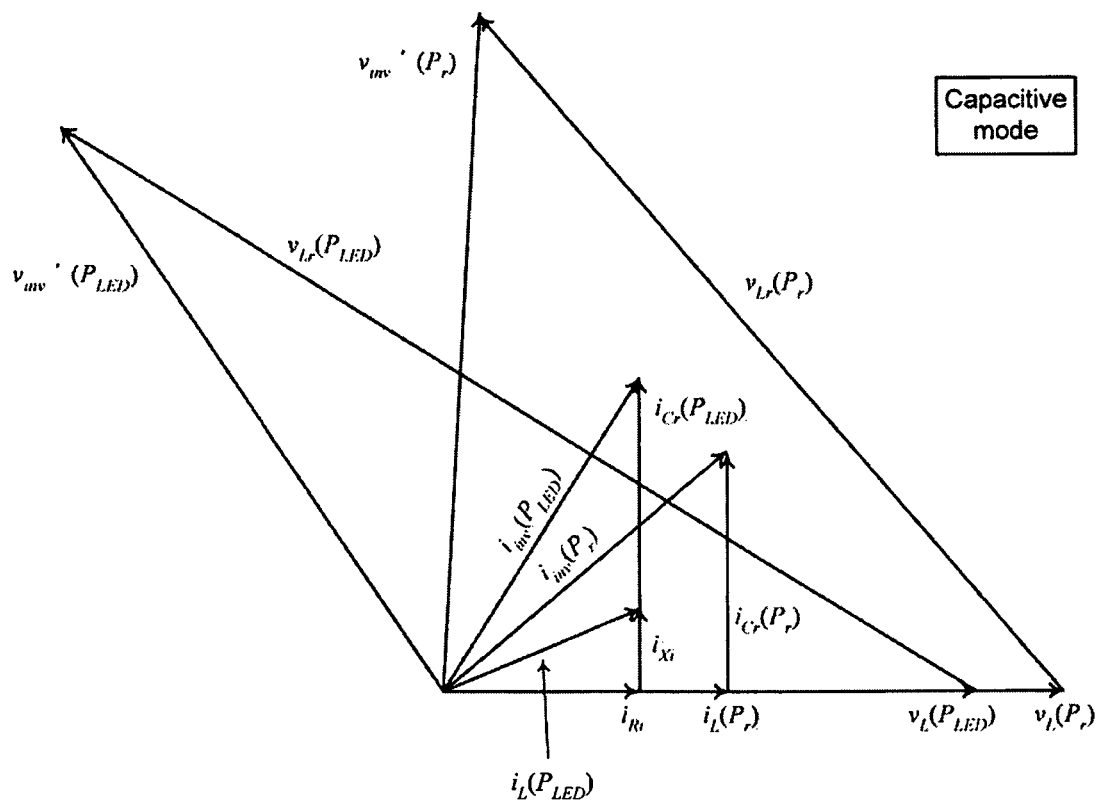
FIG. 10(a) shows the relationships between voltage and current phasors of the ballast circuit modified according to FIG. 7 if the input of the LED system is capacitive.
Figure 10B:
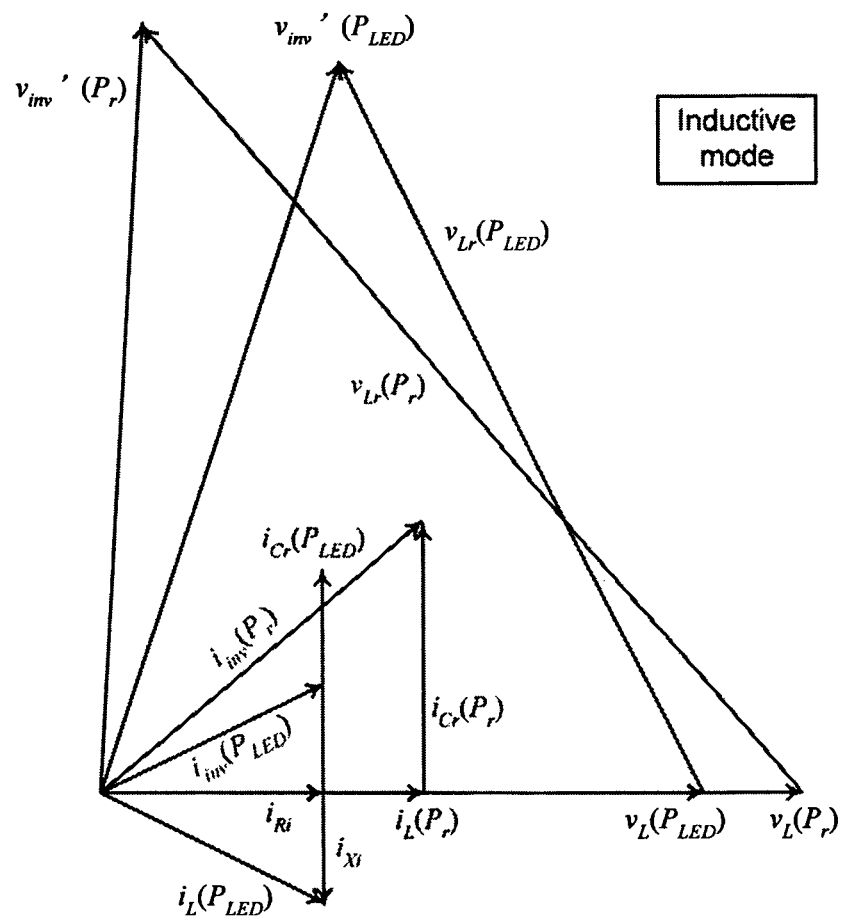
FIG. 10(b) shows the relationships between voltage and current phasors of the ballast circuit modified according to FIG. 7 if the input of the LED system is inductive.
Figure 11A:
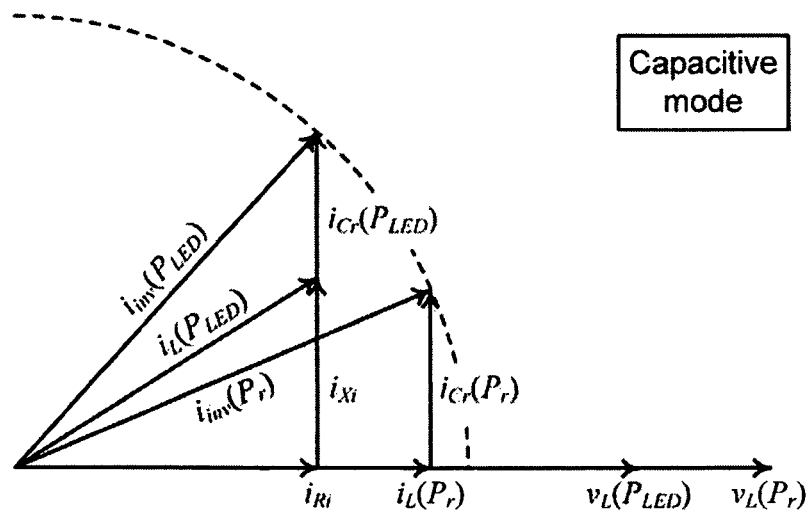
FIG. 11(a) shows the relationships between voltage and current phasors of the ballast circuit modified according to FIG. 8 if the input of the LED system is capacitive.
Figure 11B:
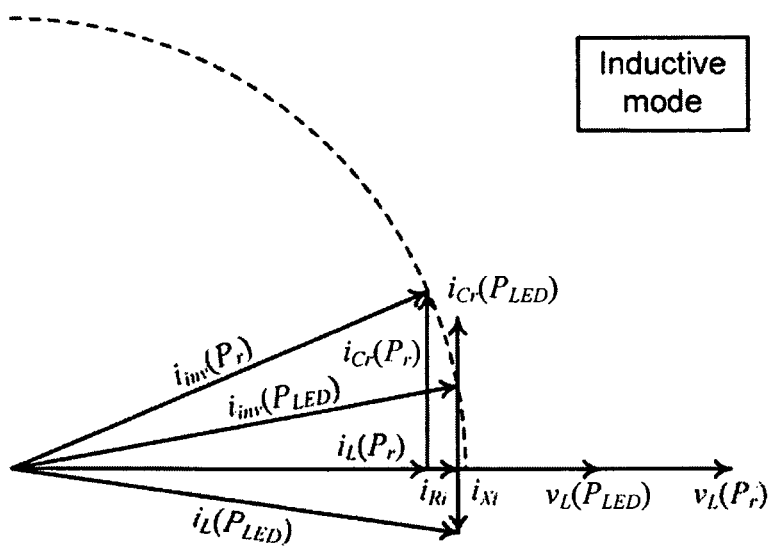
FIG. 11(b) shows the relationships between voltage and current phasors of the ballast circuit modified according to FIG. 8 if the input of the LED system is inductive.

A LED driver circuit 56 is connected between the two inductors 52, 54 as shown in FIGS. 7 and 8. A LED light element 58 is connected to the LED driver circuit 56 to receive power therefrom. As the power of the LED lamp $P_{LED}$ 44 is usually much smaller than the power of the fluorescent lamp $P_r$ 26, the input characteristic of the LED driver 56 is not purely resistive as in FIG. 1 but partially reactive. FIG. 9 shows the equivalent input of the LED driver circuit 56. Without the inverter current feedback, FIG. 10(a) shows the relationships among the voltage and current phasors of the ballast 10 and LED driver 56 if the input of the LED system is capacitive. FIG. 10(b) shows the relationships if the input of the LED system is inductive. With the inverter current feedback, FIG. 11(a) shows the relationships among the voltage and current phasors of the ballast 10 and LED driver 56 if the input of the LED system is capacitive. FIG. 11(b) shows the relationships if the input of the LED system is inductive.

The equivalent input resistance $R_i$ and input reactance $X_i$ are $$R_i = \frac{|v_L(P_{LED})|^2}{P_{LED}} \text{ and} \tag{4}$$

$$X_i = \frac{|v_L(P_{LED})|}{\sqrt{|i_{inv}(P_{LED})|^2 - \left[\frac{P_{LED}}{|v_L(P_{LED})|}\right]^2} - \omega C_r |v_L(P_{LED})|} \tag{5}$$

where $P_{LED}$ is the power of the LED lamp.

Thus, the reactive power $Q_{LED}$ handled by the LED driver is $$Q_{LED} = |v_L(P_{LED})| \left\{ \sqrt{|i_{inv}(P_{LED})|^2 - \left[\frac{P_{LED}}{|v_L(P_{LED})|}\right]^2} - \omega C_r |v_L(P_{LED})| \right\} \tag{6}$$

Figure 12:
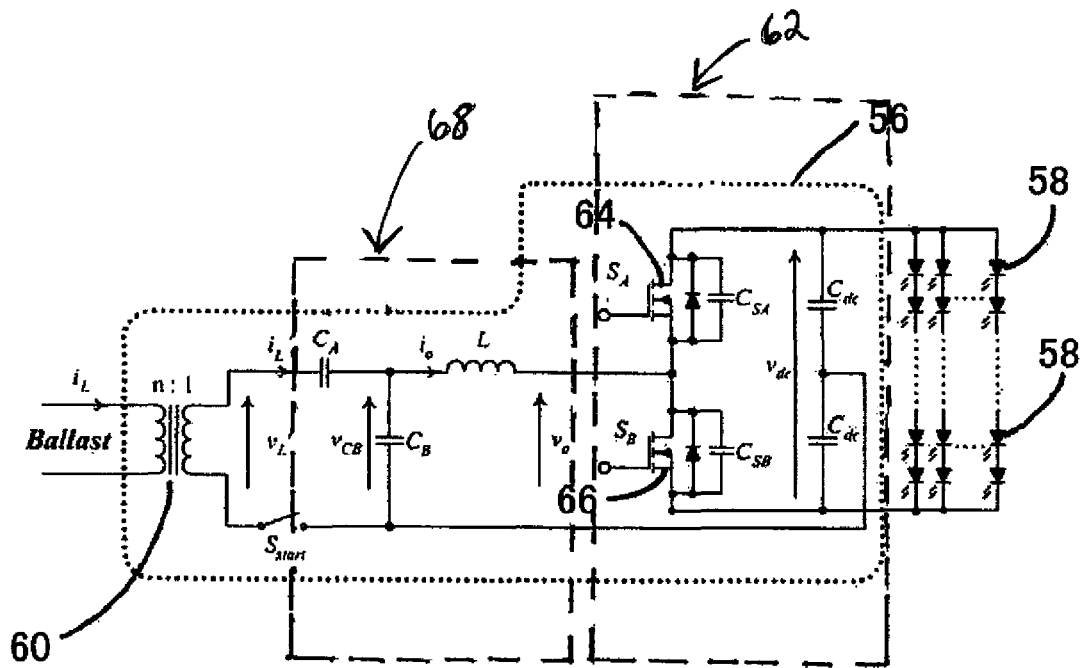
FIG. 12 is a schematic circuit diagram of a structure of a solid-state driver circuit according to the invention.
Figure 13:
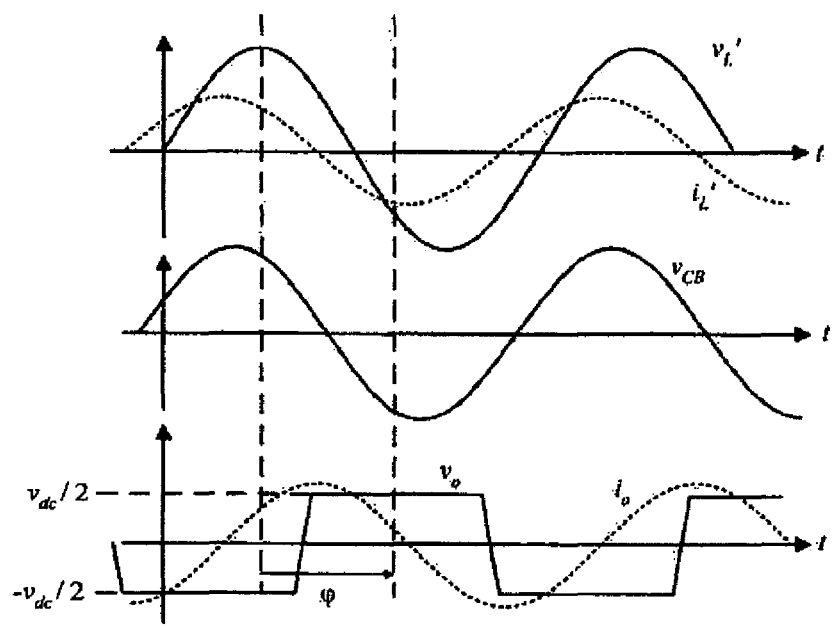
FIG. 13 illustrates waveforms associated with the circuit of FIG. 12.
Figure 14:
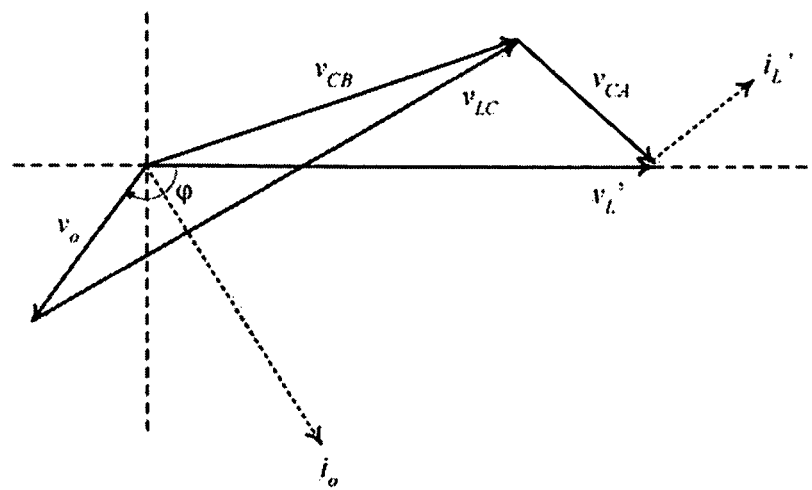
FIG. 14 illustrates phasor diagrams associated with the circuit of FIG. 12.

FIG. 12 shows the circuit schematic diagram of a structure of the LED driver 56 operating in capacitive mode. FIGS. 13 and 14 show key waveforms and phasor diagram for the circuit of FIG. 12. The driver 56 has a high-frequency transformer Tr 60 with the turns ratio of n:1. It is connected to an inverter 62 formed by the switches $S_A$ 64 and $S_B$ 66 through a resonant tank circuit 68 formed by $C_A$, $C_B$, and L. The dc side of the inverter 62 is connected to a string of LEDs 58. The gate signals to $S_A$ and $S_B$ are synchronized with the lamp voltage with a phase difference of $\phi$. The value of $\phi$ determines the power flow from the ballast to the LED string.

Let $$Z_A = \frac{1}{j\omega C_A}, Z_B = \frac{1}{j\omega C_B},$$

and $Z_C = j\omega L$. It can be shown that $$v_{CB} - \left(\frac{v'_L(P_{LED}) - v_{CB}}{Z_A} - \frac{v_{CB}}{Z_B}\right) Z_C = v_o(P_{LED}) \tag{7}$$

$$v_{CB} = \frac{Z_{AB}}{Z_C + Z_{AB}} v_o(P_{LED}) + \frac{Z_{BC}}{Z_A + Z_{BC}} v'_L(P_{LED})$$

where $$Z_{AB} = \frac{Z_A Z_B}{Z_A + Z_B}, Z_{BC} = \frac{Z_B Z_C}{Z_B + Z_C},$$

$v_L'(P_{LED})$ is the lamp voltage reflected to the secondary side of the transformer at the lamp power $P_{LED}$, and $v_o(P_{LED})$ is the inverter voltage on the ac side.

Thus, the input current $i_L$ of the LED driver 56 reflected to the secondary side $i_L'$ is $$i'_L(P_{LED}) = \frac{v'_L(P_{LED}) - v_{CB}}{Z_A} = j[K_1 v'_L(P_{LED}) - K_2 v_o(P_{LED})] \tag{8}$$

where $$K_1 = \frac{1 - \omega^2 L C_B}{1 - \omega^2 L(C_A + C_B)} \omega C_A \text{ and}$$

$$K_2 = \frac{1}{1 - \omega^2 L(C_A + C_B)} \omega C_A.$$

By taking $$v_o(P_{LED}) = |v_o(P_{LED})| e^{j\varphi} \tag{9}$$
$$= |v_o(P_{LED})| \cos\varphi + j|v_o(P_{LED})| \sin\varphi$$

The active power $P_{LED}$ and reactive power $Q_{LED}$ transferring from the ballast to LEDs 58 are calculated by substituting (9) into (8). Thus, $$P_{LED} = \text{Re}[v'_L(P_{LED}) i'_L(P_{LED})^*] \tag{10}$$
$$= \frac{1}{n} K_2 |v_L(P_{LED})| |v_o(P_{LED})| \sin\varphi \text{ and}$$

$$Q_{LED} = \text{Im}[v'_L(P_{LED}) i'_L(P_{LED})^*] \tag{11}$$
$$= -\frac{1}{n^2} K_1 |v_L(P_{LED})|^2 + \frac{1}{n} K_2 |v_L(P_{LED})| |v_o(P_{LED})| \cos\varphi$$

where Re[•] and Im[•] are the real and imaginary parts of the function, respectively, and $i_L'(P_{LED})^*$ is the conjugate of $i_L'(P_{LED})$.

By considering the fundamental ac component, the rms value of the component in $v_o$ is $$|v_o(P_{LED})| = \frac{\sqrt{2} \, v_{dc}(P_{LED})}{\pi} \tag{12}$$

where $v_{dc}(P_{LED})$ is the voltage across the LED string at the power $P_{LED}$.

Figure 15A:
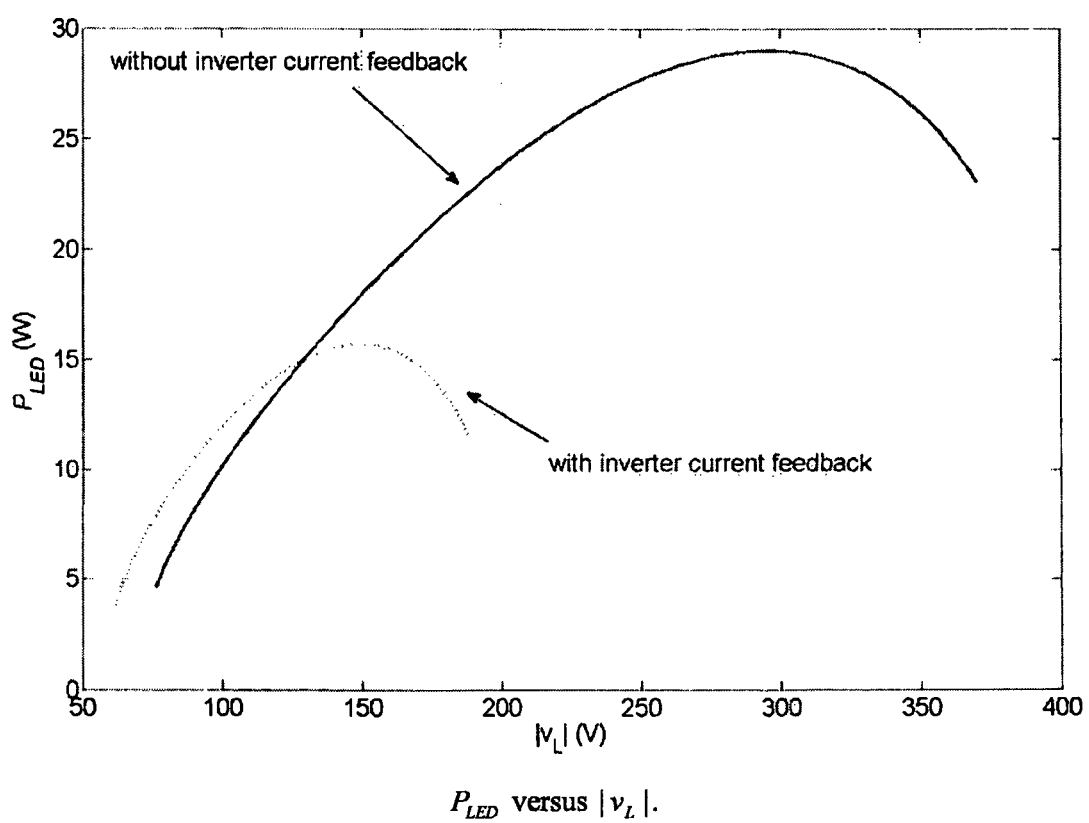
FIG. 15(a) shows the relationship of light element power versus voltage in accordance with the embodiments of the present invention.
Figure 15B:
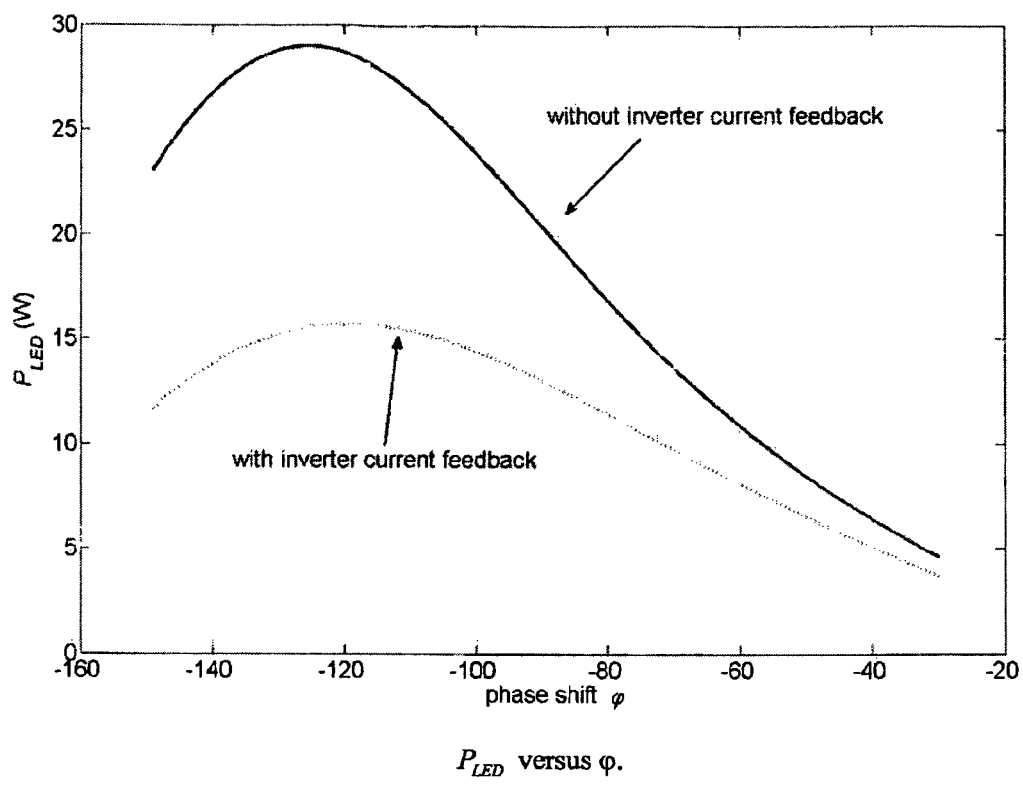
FIG. 15(b) shows the relationship of light element power versus phase in accordance with the embodiments of the present invention.
Figure 15C:
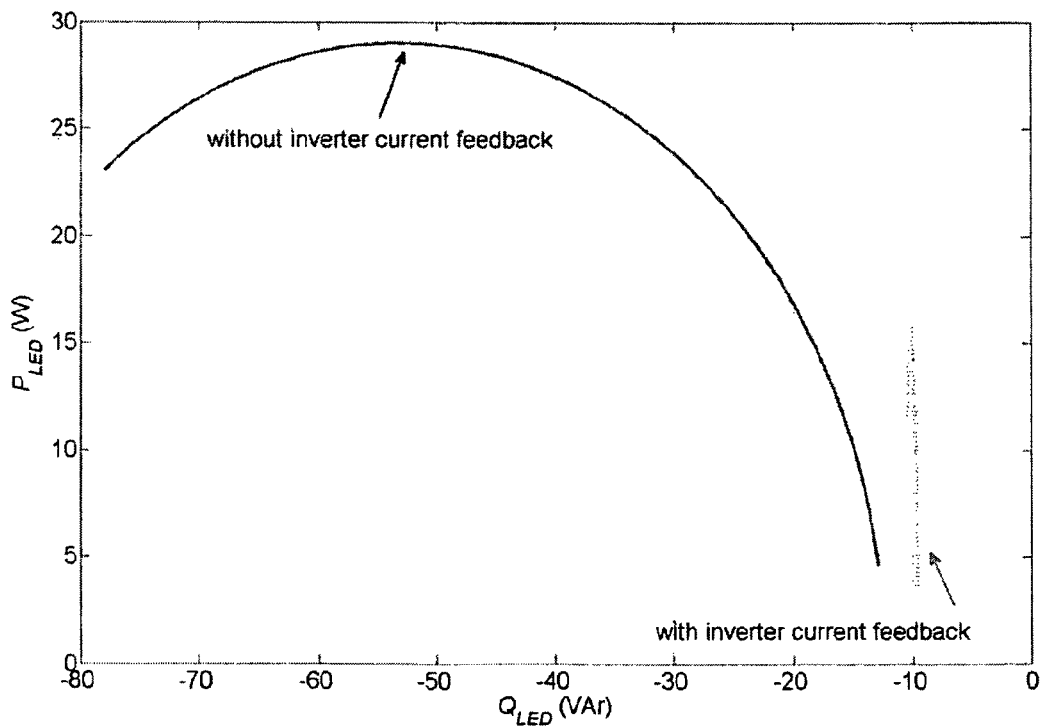
FIG. 15(c) shows the relationship of light element power versus Q in accordance with the embodiments of the present invention.

FIG. 15(a) shows the relationships of $P_{LED}$ versus $|v_L|$, FIG. 15(b) $P_{LED}$ versus $\phi$, and FIG. 15(c) $P_{LED}$ versus $Q_{LED}$. The component values of the ballast 10 and LED driver 56 used in the analysis are given in Table I and Table II below, respectively, although it will be understood that these are provided by way of example. The power supplying to the LEDs 58 can be varied by changing the value of $\phi$. The same set of the component values is set for the ballast with and without the inverter current feedback. With the same value of φ, the power supplying to the LED is higher in the ballast without inverter current feedback. Thus, the LED driver 56 is designed to deliver the same power and lamp voltage for the ballast with and without the inverter current feedback. For example, in the design study, the maximum power supplying to the LED is 15 W and the lamp voltage is 129V.

As the voltage across the LED string in FIG. 12 is almost constant, the output power can be regulated by sending the output current to the LED string and adjusting the value of φ.

The condition for ensuring soft-switching switches $S_A$ and $S_B$ is based on ensuring that $i_o$ leads $v_o$. Based on FIG. 12, $$i_o = \frac{k_c|v'_L|\angle\varphi - |v_o|\angle 0°}{Z_{AB} + Z_C} \quad (13)$$

where $$Z_{AB} = \frac{Z_A Z_B}{Z_A + Z_B} \text{ and } k_c = \frac{Z_B}{Z_A + Z_B} = \frac{C_A}{C_A + C_B}.$$

$i_o$ leads $v_o$ if the imaginary part of $i_o$ is positive. Thus, the soft-switching condition will satisfy if $$\text{Im}[i_o] > 0 \quad (14)$$
$$\Rightarrow \frac{k_c|v'_L|\cos\varphi - |v_o|}{k_z + \omega L} < 0$$

where $$k_z = -\frac{1}{\omega(C_A + C_B)}.$$

Hence, if $(k_z + \omega L) > 0$, the soft-switching condition is $$k_c|v'_L|\cos\varphi < |v_o| \quad (15)$$

If $(k_z + \omega L) < 0$, the soft-switching condition is $$k_c|v'_L|\cos\varphi > |v_o| \quad (16)$$

Equation (15) is used, because the resonant frequency of the inverter output filter formed by L and $C_B$ is designed to be at the operating frequency of the ballast. Thus, $\omega L > -k_z$.

It can be seen from the foregoing that the invention provides a circuit for controlling power being supplied to a dc-powered light element in a lighting circuit, said power control circuit being connectable directly to an output of an electronic ballast of the lighting circuit, said power control circuit being arranged to control a level of power being supplied to said dc-powered light element such that a maximum power deliverable to the dc-powered light element is substantially equal to a rated output power of the electronic ballast. Preferably, the circuit is configured for connection to output terminals of an electronic ballast in an existing light circuit. The light element may comprise a solid-state light element such as a light emitting diode 'LED'. The circuit enables an existing lighting circuit as shown in FIG. 1 to be modified to include at the output terminals 28a,b of the electronic ballast 10 a circuit as shown in FIG. 7 or 8.

Figure 16:
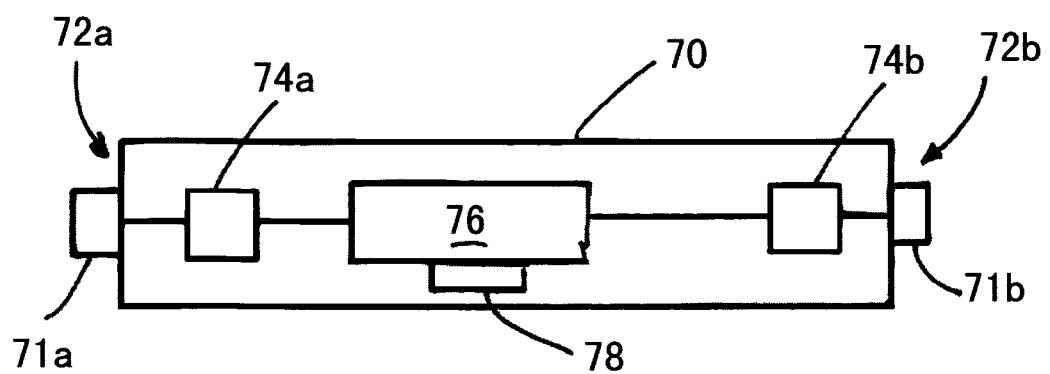
FIG. 16 is a schematic diagram of a lamp tube embodiment of the present invention.

In an existing light fixture in an existing light circuit as represented by terminals 28,a,b in FIG. 1, it is possible to implement the power control circuit (FIG. 7 or 8) of the invention as a physical lamp tube modeled on an existing fluorescent tube which is adapted to locate in an existing lamp fixture housing terminals 28a,b. In the present invention therefore, a solid state lamp unit of the same size and configuration to an existing fluorescent lamp unit could be provided in accordance with the invention. The solid state (LED) lamp tube 70 may be as shown in FIG. 16. The lamp tube has first and second electrical connectors 71a, b at its ends 72a,b respectively adapted to mechanically and electrically locate into an existing fluorescent lamp tube fixture in an existing light circuit. Located within the lamp tube 70 are first and second inductor components 74a, b which are physical embodiments of the inductors 52, 54 of FIGS. 7 and 8. Electrically connected between said inductor components 74a,b is a solid state light element drive circuit 76 according to the invention as depicted by, for example, FIG. 12 and connected to said driver circuit is one or more solid-state light elements 78 such as LEDs which are arranged to receive drive power from the drive circuit 76.

In an another arrangement, a novel lamp fixture is provided having a light circuit including an electronic ballast for powering a dc-powered light element connected between output terminals of the light circuit; first and second inductors connected to respective ones of the output terminals; a driver circuit for a dc-powered light element connected between said first and second inductors; and a dc-powered light element connected to the driver circuit to be powered by said driver circuit. The dc-powered lamp element may be one or more light emitting diodes 'LEDs'. The light circuit may comprise a switching converter arranged to model input impedance characteristics for the electronic ballast.

It can further be seen that the invention provides a method of controlling power being supplied to a dc-powered light element in a lighting circuit, said power control circuit being connectable directly to an output of an electronic ballast of the lighting circuit, said method comprising: controlling a level of power being supplied to said dc-powered light element such that a maximum power deliverable to the dc-powered light element is substantially equal to a rated output power of the electronic ballast. The power being supplied to the dc-powered light element may be controlled to be substantially less than the maximum power deliverable to said light element but such that said light element emits a similar light output as a fluorescent light element operating at said maximum power.

An application of the proposed technology is preferably an LED lamp tube. By placing the apparatus inside the lamp tube, the lamp can operate with electronic ballasts directly without replacement of the existing electronic ballasts with LED ballasts and without modification of the infrastructure or fixtures of the lighting network. The solution is environmentally-friendly. Of particular importance, it can save energy because the required power consumption of the LED lamp that gives the same brightness as a fluorescent lamp is less than that of the fluorescent lamp. Since the proposed technology can control the power supply to the lamp, it can offer an extra function of dimming the lamp, even with an existing non-dimmable electronic ballast.

In general, the invention provides an apparatus that can operate with electronic ballasts for electric discharge lamps to drive dc-powered lighting equipment. Typical examples of the dc-powered lighting equipment are LED lamps, halogen lamps and incandescent lamps. The apparatus is directly connected to the output of the electronic ballast and is then used to control the power supplying to the dc-powered lighting equipment. The maximum power delivered to the dc-powered equipment is substantially equal to the rated output power of the electronic ballast. The concept of the proposed technology is based on using a switching converter to fabricate the necessary input impedance characteristics for the ballast. Thus, the active power and reactive power drawn from the ballast can be controlled. The output of the switching converter provides dc power for the dc-powered lighting equipment. An application of the proposed technology is an LED lamp tube. By placing the apparatus inside the lamp tube, the lamp can operate with electronic ballasts directly without replacement of the existing electronic ballasts with LED ballasts and modification of the infrastructure of the lighting network. The solution is environmentally-friendly. Of particular importance, it can save energy because the required power consumption of the LED lamp that gives the same brightness as a fluorescent lamp is less than that of the fluorescent lamp. Since the proposed technology can control the power being supplied to the lamp, it can offer an extra function of dimming the lamp, even with a non-dimmable electronic ballast.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art, in Australia or any other country.

TABLE I

Component values of the ballast

| Parameter | Value | Parameter | Value |
|---|---|---|---|
| $V_g$ | 400 V | $i_{inv}$ | 214 mA |
| $f_s$ | 47 kHz | $C_r$ | 2.7 nF |
| $P_r$ | 28 W | $L_r$ | 3.6 mH |
| $v_L$ | 168 V | | |

TABLE II

Component values of the LED driver

| Parameter | Value | Parameter | Value |
|---|---|---|---|
| $C_A$ | 100.8 nF | n | 4 |
| $C_B$ | 251.2 nF | $v_{dc}$ | 40 V |
| L | 68.8 µH | | |

The invention claimed is:

1. A circuit for controlling power being supplied to a dc-powered light element in a lighting circuit, comprising
a power control circuit arranged to connect directly to an output of an electronic ballast of the lighting circuit, the electronic ballast including a first inverter having at least two switches connected to a resonant tank,
said power control circuit including a second inverter formed by at least two switching components, wherein a dc side of said second inverter is arranged to connect to said dc-powered light element, and
wherein said second inverter is arranged to model input impedance characteristics for the electronic ballast so as to control an active power and a reactive power drawn from the electronic ballast, such that said power control circuit is further arranged to control and change a level of power being supplied to said dc-powered light element such that a maximum power received by the dc-powered light element is equal to a rated output power of the electronic ballast.

2. The circuit as claimed in claim 1, wherein said circuit is configured for connection to output terminals of an electronic ballast in an existing light circuit.

3. The circuit as claimed in claim 1, wherein the light element comprises a solid-state light element.

4. The circuit as claimed in claim 1, wherein the light element comprises a light emitting diode 'LED'.

5. The circuit as claimed in claim 1, wherein the power control circuit is mounted in a LED lamp tube and wherein the LED lamp tube is configured to be locatable in an existing lamp fixture without requiring modification of the existing light circuit or the existing lamp fixture.

6. The circuit as claimed in claim 1, wherein the power control circuit comprises a first inductor and a second inductor components that are adapted to connect to respective light element power supply terminals of the lighting circuit, and a light emitting diode drive circuit connected between said first and second inductors.

7. The circuit as claimed in claim 6, wherein each of the first and second inductors has an inductance value which is proportional to a resistance of a lamp filament divided by a steady-state operating frequency of the existing light circuit.

8. A lamp fixture comprising:
a light circuit including an electronic ballast for powering a dc-powered light element connected between output terminals of the light circuit, the electronic ballast including a first inverter having at least two switches connected to a resonant tank;
a first inductor and a second inductors connected to respective ones of the output terminals;
a driver circuit for a dc-powered light element connected between said first inductor and said second inductor; and
a dc-powered light element connected to the driver circuit powered by said driver circuit; wherein said driver circuit includes a second inverter formed by at least two switching components, wherein a dc side of said second inverter is arranged to connect to said dc-powered light element, and wherein said second inverter is arranged to model input impedance characteristics for the electronic ballast so as to control an active power and a reactive power drawn from the electronic ballast, such that said driver circuit is further arranged to control and change a level of power supplied to said dc-powered light element such that a maximum power deliverable to the dc-powered light element is equal to a rated output power of the electronic ballast.

9. The lamp fixture as claimed in claim 8, wherein the dc-powered lamp element is one or more light emitting diodes 'LEDs'.

10. The lamp fixture as claimed in claim 8, wherein the light circuit comprises a switching converter arranged to model input impedance characteristics for the electronic ballast.

11. A light circuit for powering a dc-powered light element, said light circuit comprising:
 an electronic ballast for powering a dc-powered light element connected between output terminals of the light circuit, the electronic ballast including a first inverter having at least two switches connected to a resonant tank;
 a first inductor and a second inductor connected to respective ones of the output terminals;
 a driver circuit for a dc-powered light element adapted to connect between said first inductor and said second inductor; and
 a dc-powered light element connected to the driver circuit that is powered by said driver circuit;
 wherein said driver circuit includes a second inverter formed by at least two switching components, wherein a dc side of said second inverter is arranged to connect to said dc-powered light element, and wherein said second inverter is arranged to model input impedance characteristics for the electronic ballast so as to control an active power and a reactive power drawn from the electronic ballast, such that said driver circuit is further arranged to control and change a level of power supplied to said dc-powered light element such that a maximum power deliverable to the dc-powered light element is equal to a rated output power of the electronic ballast.

12. The light circuit as claimed in claim 11 having a LED connected thereto.

13. A LED lamp tube comprising a light circuit having:
 an electronic ballast for powering a dc-powered light element connected between output terminals of the light circuit, the electronic ballast including a first inverter having at least two switches connected to a resonant tank;
 a first inductor and a second inductor connected to respective ones of the output terminals;
 a driver circuit for a dc-powered light element adapted to connect between said first inductor and said second inductor; and
 a dc-powered light element connected to the driver circuit that is powered by said driver circuit;
 wherein said lamp tube is configured to be locatable in an existing lamp fixture without requiring modification of an existing light circuit or the existing lamp fixture, and
 wherein said driver circuit includes a second inverter formed by at least two switching components, wherein a dc side of said second inverter is arranged to connect to said dc-powered light element, and wherein said second inverter is arranged to model input impedance characteristics for the electronic ballast so as to control an active power and a reactive power drawn from the electronic ballast, such that said driver circuit is further arranged to control and change a level of power supplied to said dc powered light element such that a maximum power deliverable to the dc-powered light element is equal to a rated output power of the electronic ballast.

14. A method of controlling power being supplied to a dc-powered light element in a lighting circuit by a power control circuit having at least two switching components,
 said power control circuit including a first inverter formed by said at least two switching components, said power control circuit being connectable directly to an output of an electronic ballast of the lighting circuit,
 the electronic ballast having a second inverter including at least two switches connected to a resonant tank, wherein a dc side of said first inverter is arranged to connect to said dc-powered light element, and wherein said first inverter is arranged to model input impedance characteristics for the electronic ballast so as to control an active power and a reactive power drawn from the electronic ballast, said method comprising:
 controlling said at least two switching components to change a level of power being supplied to said dc-powered light element such that a maximum power deliverable to the dc-powered light element is equal to a rated output power of the electronic ballast.

15. The method as claimed in claim 14, wherein the power being supplied to the dc-powered light element is controlled to be less than the maximum power deliverable to said light element but such that said light element emits a similar light output as a fluorescent light element operating at said maximum power.

* * * * *